May 20, 1930.    J. F. THOMSON    1,759,072
LOADING MACHINE
Filed Sept. 15, 1927    3 Sheets-Sheet 1

Inventor
John F. Thomson

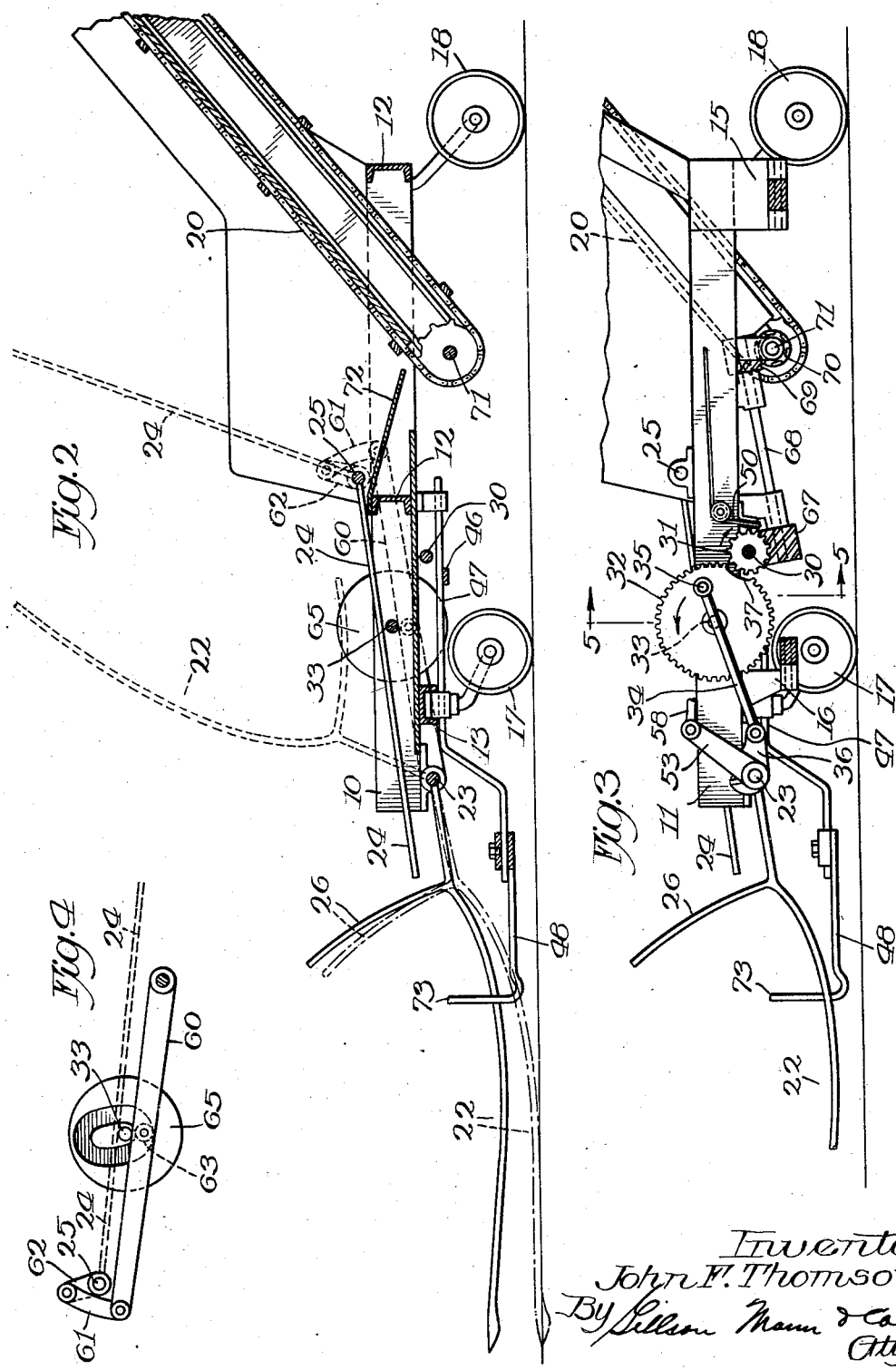

May 20, 1930.  J. F. THOMSON  1,759,072
LOADING MACHINE
Filed Sept. 15, 1927   3 Sheets-Sheet 3
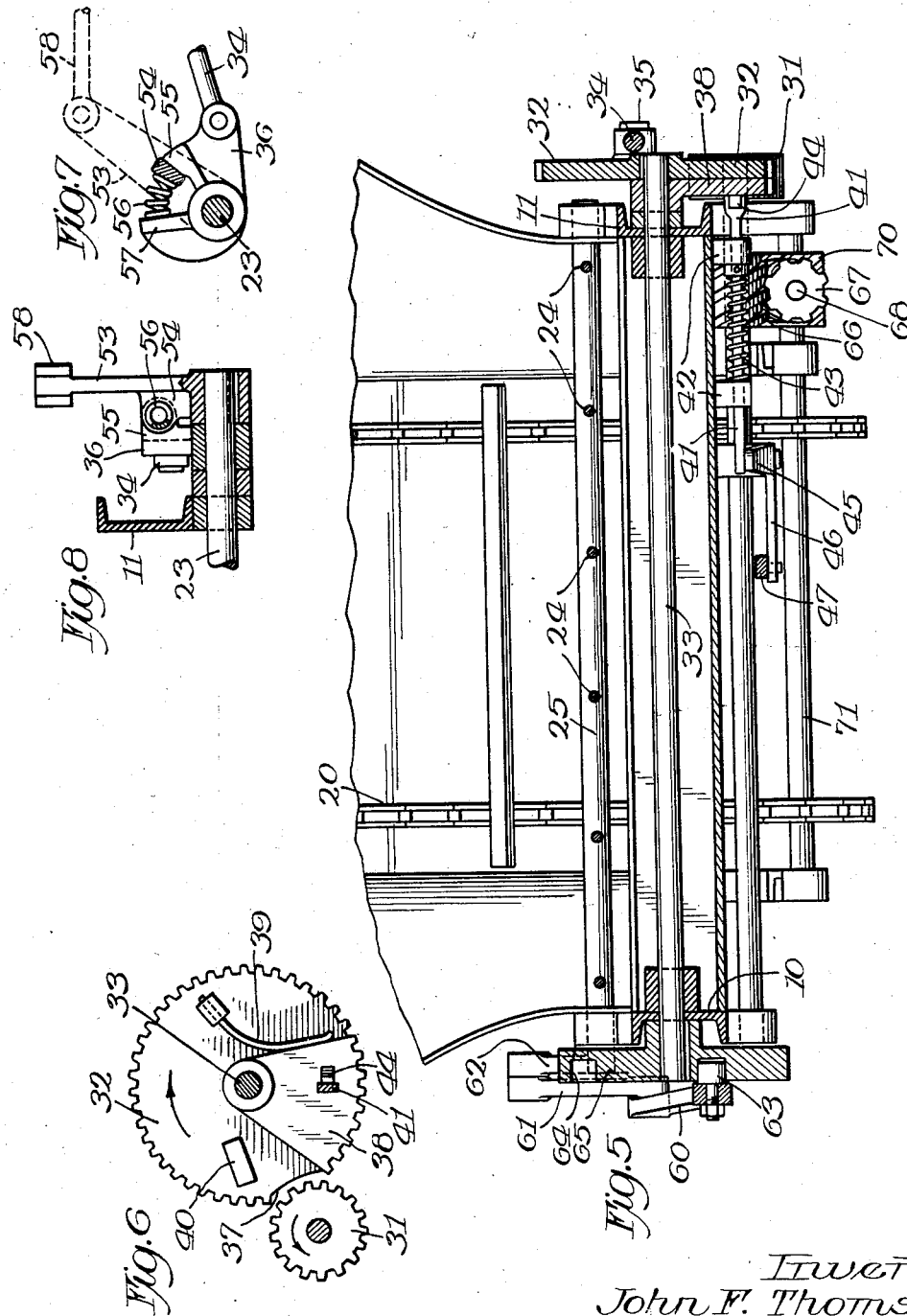

Patented May 20, 1930

1,759,072

UNITED STATES PATENT OFFICE

JOHN F. THOMSON, OF CHICAGO, ILLINOIS

LOADING MACHINE

Application filed September 15, 1927. Serial No. 219,630.

The invention relates to machines for loading farm products, and in the embodiment of the invention hereinafter disclosed is especially adapted for the loading of grain in the shock, upon a wagon.

The object of the invention is to provide a power actuated machine of this class, which consists of a device such as hereinafter described and as illustrated in the accompanying drawings, in which Fig. 1 is a plan view;

Figs. 2 and 3 are sectional views respectively on the lines 2—2 and 3—3 of Fig. 1;

Fig. 4 is a detail of certain operating parts of the machine;

Fig. 5 is a detailed section on the line 5—5 of Fig. 3; and

Figs. 6, 7 and 8 are details partly in section of certain of the operative parts of the machine.

Figure 1:
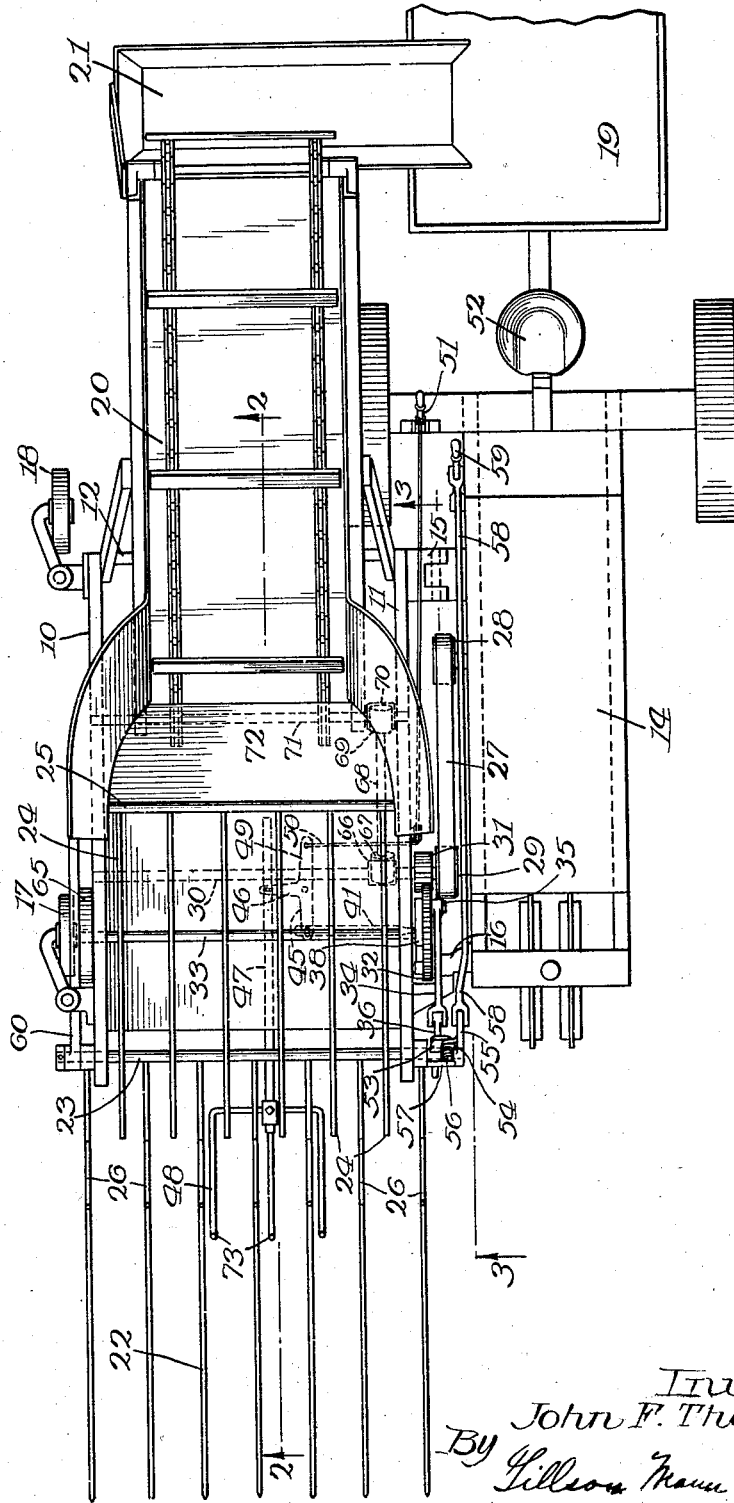

The machine comprises a frame composed of side bars as 10, 11 and cross bars as 12, 13, adapted to be attached to a tractor generally represented by the numeral 14, as by means of jointed brackets 15, 16. The machine may be supported on one side by the tractor as shown, and on the opposite side may be provided with carrying wheels 17, 18, preferably of the caster type.

The wagon to be loaded, indicated at 19, may be coupled immediately back of the tractor. An elevator 20 of any preferred form, here shown as of the endless chain type, is mounted on the rear end of the framing of the machine and provided with a delivery chute 21 overhanging the wagon 19.

A lifting element 22 is carried by a shaft 23 journaled across the front end of the machine, preferably in the side bars 10 and 11 and is adapted to swing from an approximately horizontal position to an approximately upright position, as indicated by dotted lines in Fig. 2.

A delivery element 24 is carried by a shaft 25 journaled in the side members 10 and 11 of the frame between the shaft 23 and the foot of the elevator 20 and is adapted to oscillate from a substantially horizontal position as shown in solid lines in Fig. 2, to an approximately upright position as indicated in dotted lines in the same figure.

The lifting element is adapted to be thrust under the material to be loaded, by the forward movement of the tractor, and then by means of power derived from the tractor to be swung upwardly, whereupon, and preferably before the lifting element completes its upward stroke, the delivery element 24 is swung upwardly, carrying the material from the lifting element and depositing it upon the elevator 20 which discharges it into the chute 21 and it is thereby delivered by gravity into the wagon.

The lifting element may be provided with a support 26 for the material, this support projecting upwardly from the inner end portion of the lifting element and serving to limit the extent to which the lifting element may be thrust under the material and to support the material when the lifting element approaches the upright position and before it is transferred therefrom by the delivery element 24.

Power for actuating the movable parts of the machine is derived from the tractor, as by means of a belt 27 running over a pulley 28 on the tractor and a pulley 29 carried by a shaft 30 journaled in the side frames of the machine.

Upon the shaft 30 there is fixed a pinion 31 meshing with the gear wheel 32 fixed upon a shaft 33 journaled in the side frames of the machine. A pitman 34 connects a crank pin 35 carried by the gear wheel 32 with a crank arm 36 operatively connected with the shaft 23 whereby the rotation of the gear 32 causes the oscillation of the lifting element 22.

In order that the operation of the lifting element may be interrupted notwithstanding the continuous turning movement of the pinion 31, the gear 32 is of the mutilated type, being provided with a plain or toothless segment 37 as plainly shown in Fig. 6. A toothed sector 38 is loosely mounted on the shaft 33 in sliding contact with the gear 32 and of the same radius as such gear. This sector is normally urged as by means of a spring 39 secured to the face of the gear 32 against a stop lug 40 formed on the face of the gear, and when in this position covers the toothless segment 37 and cooperates with the pinion 31, the face of which is of sufficient width to overlap it.

A detent in the form of a slide rod 41 carried by suitable brackets as 42 attached to one of the cross members of the frame of the machine, is urged forwardly as by a spring 43 so that its outer end is in the path of a lug 44 projecting from the disc face of the sector 38, thereby arresting the movement of the sector against the resistance of the spring 39 to uncover the toothless segment 37 and thus bring the gear 32 to rest.

The inner end of the rod 41 is pivotally attached to one arm 45 of a bell crank lever suitably pivoted to the frame of the machine, the other arm 46 of such lever being pivotally attached to a thrust rod 47 which projects forwardly beyond the shaft 23 and carries a suitable abutment as 48 which is engaged by the material under which the elevating element 22 is thrust, and forced backwardly, thereby swinging the bell crank lever upon its pivot and withdrawing the rod 41 from engagement with the lug 44. The sector 38 is now swung forwardly by the action of the spring 39 into engagement with the pinion 31 whereupon the gear 32 is again set in motion and the lifting element 22 is caused to make a complete stroke, when it is again arrested by the action of the rod 41 which is immediately thrust forward by the spring 43 as soon as the material carried by the lifting element shall have been raised out of engagement with the abutment 48.

In order that the lifting element may be manually controlled, the bell crank lever is provided with a third arm 49 connected by means of a cable 50 with a hand lever 51 within reach of the operator who will ride on the seat 52 of the tractor 14.

It is desirable that the lifting element 22 shall normally occupy the solid lines position of Fig. 2, that is to say, being slightly elevated, in order that as the machine is moved forwardly to a succeeding collection of material to be loaded, it may not scrape upon the ground. To this end the parts are so related that the gear 32 comes to rest with the lifting element in this partially elevated position. The crank arm 36 is loosely journaled on the shaft 23 and is operatively connected with this shaft through the medium of a crank arm 53 fixed upon the shaft, a lug 54 projecting laterally from the last-named arm and engageable by a shoulder 55 on the crank arm 36, and a spring 56 reacting between this lug and a shoulder 57 also carried by the crank arm 36. A rod 58 leads back from the crank arm 53 to a hand lever 59 within convenient reach of the occupant of the seat 52. By swinging the hand lever 59 forwardly the operator may depress the lifting element against the resistance of the spring 56, and hold it in depressed position until it shall have received its load.

For the purpose of causing the oscillation of the delivery element 24 a swinging arm 60 is pivoted to the forward end of the frame of the machine and extends backwardly beyond and below the shaft 25, its rearward end being connected by means of a link 61 with a crank arm 62 fixed upon the shaft. A stud 63 projects laterally from the arm 60 into a cam slot 64 formed in a cam element 65 carried by the shaft 33. The cam slot 64 is so shaped and positioned relatively to the plain segment 37 of the gear 32 as to properly time the movements of the lifting and delivering elements.

Suitable gearing is provided for driving the elevator 20. For this purpose there is shown a spiral gear 66 fixed upon the shaft 30 and meshing with a similar gear 67 carried by shaft 68 journaled in suitable brackets depending from the frame of the machine and carrying at its opposite end a spiral gear 69 meshing with a complementary gear 70 fixed upon the lower shaft 71 of the elevator.

A plate 72 is preferably positioned upon the frame of the machine below the shaft 25 and is inclined downwardly to the lower end of the elevator for preventing the loss of any of the material carried over by the delivery element.

As shown, the machine is especially adapted for the loading of grain shocks or hay, the lifting element 22 and delivery element 24 taking the form of forks. The support 26 is also in the form of a series of spaced bars between which the ends of the bars composing the delivery element 24 may pass. The abutment 48 is also formed of a series of bars having upturned ends 73 of sufficient length to project through and above the lifting element when the latter is depressed.

The machine may be constructed or adapted for the loading of tubers or root stock by suitable changes in the lifting and delivery elements to handle such material.

The machine may be changed as to various features from the forms shown and described, within the scope of the invention.

I claim as my invention:

1. In a machine of the class described, in combination, a suitable frame adapted for attachment to a tractor, an oscillating lifting element, an oscillating delivery element receiving from the lifting element, gearing for actuating such elements in timed relation, and means for operating such gearing intermittently by a power shaft of the tractor.

2. In a machine of the class described, in combination, a suitable frame adapted for attachment to a tractor, an oscillating lifting element, an oscillating delivery element receiving from the lifting element, an elevator receiving from the delivery element, gearing for actuating such three movable elements, and means for operating such gearing intermittently by a power shaft of the tractor.

3. In a machine of the class described, in combination, a portable frame, a rock shaft carried by the frame, a lifting fork fixed to the shaft normally projecting forwardly from the frame, means for turning the shaft and raising the fork and being normally disconnected therefrom, a movable abutment adjacent to the rear end of the fork when the latter is in its normal position for connecting upon its backward movement the raising means with the fork.

4. In a machine of the class described, in combination, an oscillating lifter, means for actuating the lifter comprising a mutilated gear wheel, a toothed sector normally completing the gear, a detent for holding the sector in withdrawn position, and a movable abutment positioned to be actuated by material received upon the lifter for disengaging the detent.

5. In a machine of the class described, in combination, an oscillating lifter, means for actuating the lifter, means for automatically disconnecting the actuating means before the lifter has reached its load-receiving position during its lowering movement, manual means for positioning the lifter to receive its load, and means actuated by the load as delivered to the lifter for reengaging the actuating means.

6. In a machine of the class described, in combination, a portable frame, an oscillatable lifting fork normally projecting forwardly from the frame, a rotating crank shaft, connection between the crank of the shaft and the lifting fork, an oscillatable delivering fork mounted on the frame back of the lifting fork and normally projecting forwardly, a crank arm carried by the delivering fork, a cam carried by the crank shaft, and operative connection between the cam and the crank arm, the cam and crank of the crank shaft being so related that the upward movement of the delivery fork commences as the lifting fork approaches the limit of its upward movement.

7. In a machine of the class described, in combination, a portable frame, an oscillatable lifting fork normally projecting forwardly from the frame and adapted to be engaged with the load to be raised by the forward movement of the frame, an oscillatable delivery fork normally projecting forwardly over the base of the lifting fork, and means for oscillating the forks, the upward movement of the first named fork preceding that of the second named fork.

8. In a machine of the class described, a portable frame, an oscillating lifting fork normally projecting forwardly from the frame, a power shaft carrying a pinion, a transmission shaft for actuating the lifting fork, a mutilated gear on the last named shaft meshing with the pinion, a spring advanced toothed sector pivotally mounted on the shaft for completing the gear, means for retracting the sector, a movable abutment engageable by the load received by the fork and adapted by its backward movement to release the sector.

9. In a machine of the class described, in combination a conveyance, an oscillating lifting fork mounted on the conveyance, an oscillating delivery fork receiving from the lifting fork a trip mechanism, and means controlled by the trip mechanism for actuating the two forks, the upward movement of the delivery fork commencing during that of the lifting fork.

10. In a machine of the class described, in combination, a portable frame, a lifting fork and a delivery fork each carried by a rock shaft transversely mounted on the frame, the shaft of the delivery fork being to the rear of that of the lifting fork, the tines of the delivery fork projecting over and beyond the shaft of the lifting fork, and means for turning the two shafts to raise the forks in timed relation, the upward movement of the lifting fork commencing before that of the delivery fork.

11. In a machine of the class described, in combination, a wheel supported frame, a tractor attached to the frame, upwardly swinging lifting and delivery forks swinging about fixed centers, the latter following the former and receiving therefrom, and driving connection between the tractor and the forks.

12. In a machine of the class described, in combination, a wheel supported frame, a tractor attached to the frame at the side thereof, upwardly swinging lifting and delivery forks swinging about fixed centers, the latter following the former and receiving therefrom, and driving connection between the tractor and the forks.

13. In a device of the class described, in combination, a wheel supported frame, a lifting fork normally projecting forwardly from the frame and carried by a shaft pivotally mounted transversely thereof, a tractor attached to the frame for moving the same, driving connection between the motor of the tractor and the fork shaft, means for receiving the load raised by the fork, a trip mechanism, and means controlled by the forward movement of the frame for operating the trip mechanism.

14. In a machine of the class described, in combination, a portable frame, a pair of upwardly swinging forks pivotally mounted on the frame, one thereof projecting forwardly from the frame, the other being mounted to the rear of the forwardly projecting fork and normally overlapping the base thereof a trip mechanism, and means controlled by the trip mechanism for moving the forks upwardly in timed relation, the forwardly projecting fork moving in advance of its companion.

15. In a machine of the class described, in combination, a portable frame, a pair of upwardly swinging forks pivotally mounted on the frame, one thereof projecting forwardly from the frame, the other being mounted to the rear of the forwardly projecting fork and normally overlapping the base thereof a trip mechanism, and means controlled by the trip mechanism for moving the fork upwardly in timed relation, the upward movement of the rearward fork commencing during the upward movement of its companion.

16. In a shock loader, a wheel supported frame, an upwardly swinging fork pivotally mounted across the front of the frame, the fork being adapted to be brought into engagement with the load to be raised by the forward movement of the frame, an upwardly swinging delivery fork pivotally mounted back of the first named fork and overlapping the head thereof, and means for swinging the forks in timed relation.

17. In a shock loader, a wheel supported frame, an upwardly swinging fork pivotally mounted across the front of the frame, the fork being adapted to be brought into engagement with the load to be raised by the forward movement of the frame, an upwardly swinging delivery fork pivotally mounted back of the first named fork and overlapping the head thereof, and means for swinging the forks in timed relation, the upstroke of the delivery fork commencing during the upstroke of the first mentioned fork.

18. In a machine of the class described, in combination, an oscillating lifting fork, an oscillating delivery fork receiving from the lifting fork, means for actuating the lifting fork, a lever for actuating the delivery fork, a cam for actuating the lever, and means for actuating the cam, the fork-actuating means being timed to cause the movement of the delivery fork to follow that of the lifting fork.

19. In a machine of the class described in combination, a portable frame, a lifting fork pivoted at the forward end of the frame, and an upwardly swinging transfer fork pivoted to the rear of the lifting fork, the tines of the transfer fork being of sufficient length to enter between the tines of the lifting fork during the upstroke of the latter, and means for actuating the forks in timed relation, the upstroke of the lifting fork preceding that of the delivery fork.

In testimony whereof I affix my signature.
JOHN F. THOMSON.